March 27, 1962     C. A. MORELAND     3,026,772
CARGO LAUNCHER
Filed Feb. 3, 1958     3 Sheets-Sheet 1
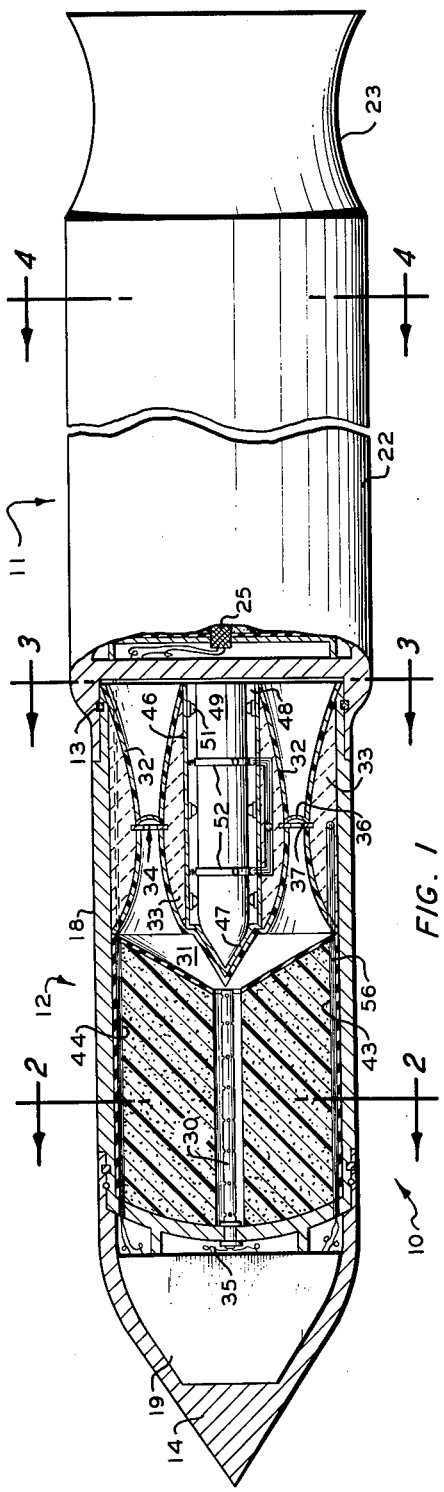
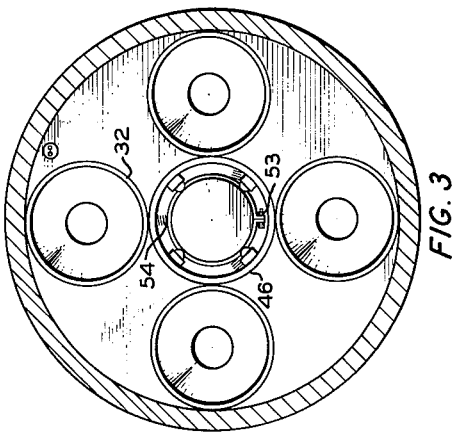
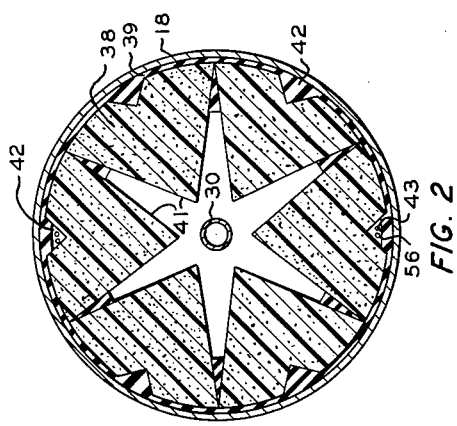
INVENTOR.
C. A. MORELAND
BY
ATTORNEYS

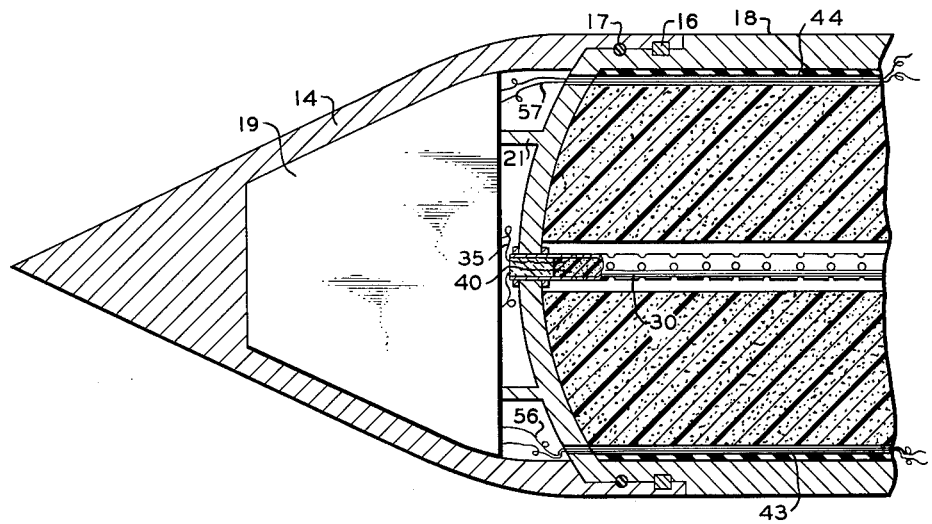
FIG. 1-A
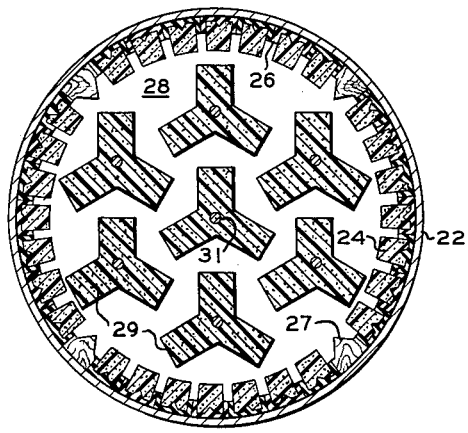
FIG. 4
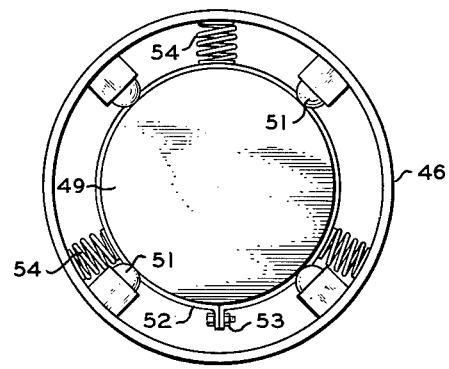
FIG. 6

March 27, 1962 C. A. MORELAND 3,026,772
CARGO LAUNCHER
Filed Feb. 3, 1958 3 Sheets-Sheet 3
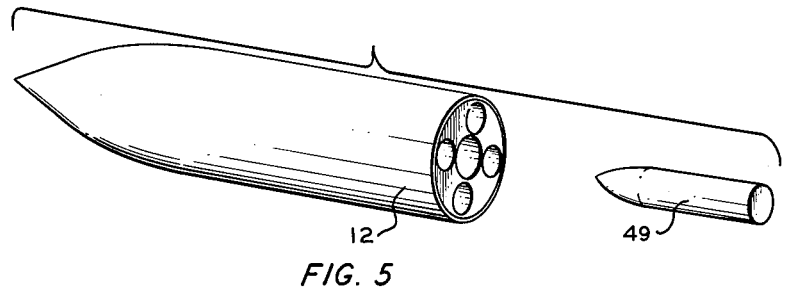
FIG. 5
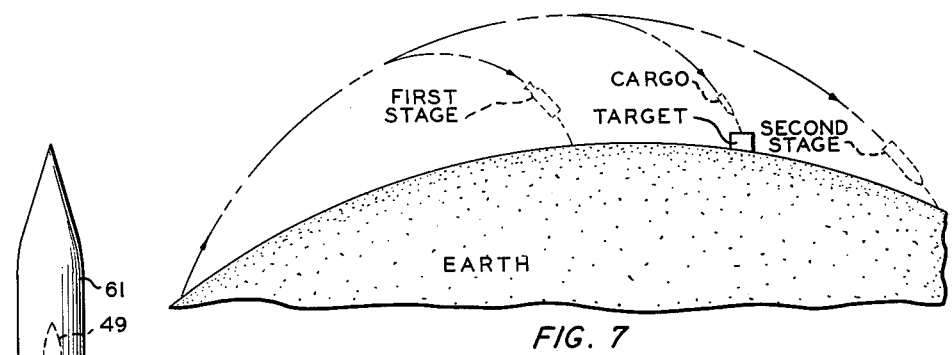
FIG. 7
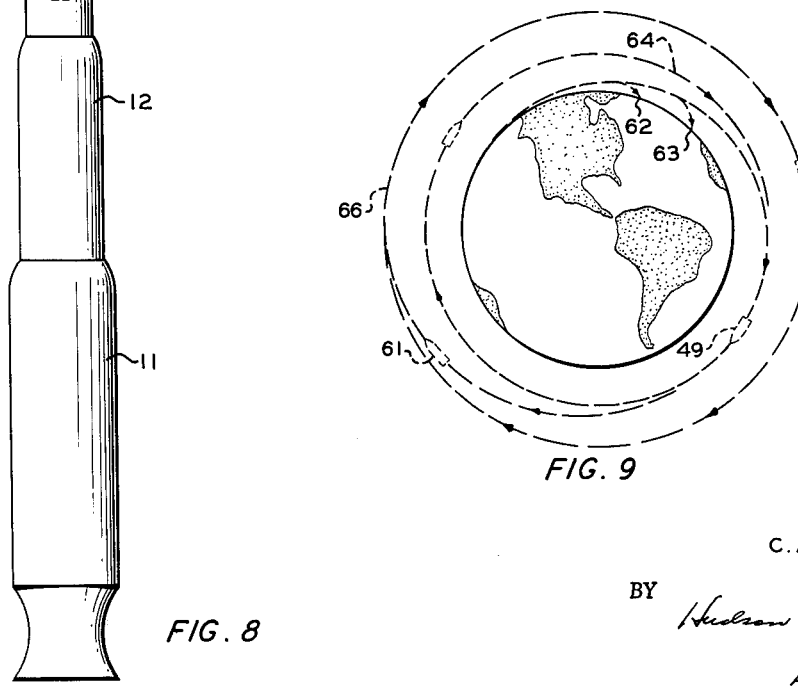
FIG. 8
FIG. 9
INVENTOR.
C. A. MORELAND
BY
ATTORNEYS United States Patent Office 3,026,772
Patented Mar. 27, 1962

3,026,772
CARGO LAUNCHER
Carlton A. Moreland, Marshall, Tex., assignor to Phillips Petroleum Company, a corporation of Delaware
Filed Feb. 3, 1958, Ser. No. 713,054
5 Claims. (Cl. 89—1.5)

This invention relates to a cargo launcher. In one aspect this invention relates to apparatus for launching a cargo into non-sustained flight from the after end of a rocket motor. In another aspect this invention relates to a method for launching a cargo into non-sustained flight from the after end of a rocket motor.

In the art of rockets and guided missiles the trajectory of a rocket or guided missile can be divided into three broad phases, (1) the booster phase, (2) the sustained phase and (3) the non-sustained phase, sometimes referred to as the free-falling phase. In the booster phase the rocket is rapidly accelerated in a short period of time from zero velocity to some predetermined extremely high velocity. Consequently, large power plants are required for the booster phase. These large power plants require a large mass of solid propellant (e.g., up to three tons) designed to impart a high effective thrust, e.g., in the order of 130,000 to 225,000 pounds and a high total impulse, i.e., in the order of one million pound seconds. The sustained phase can, in the simplest rockets include the latter part of the burning time of the propellant employed in the booster phase. However, in the larger rockets the sustained phase usually includes second, third, and higher stage rockets. In the sustained phase, thrust is still being developed and applied to the rocket and consequently the rocket is still accelerating, although not at the high initial rate of the booster phase. In the non-sustained or free-falling phase, thrust has been terminated and the rocket or missile is traveling under the force of the momentum developed and any gravitational forces which may exist. The problems associated with each phase are different. Guidance means may or may not be employed in each phase depending upon the requirements and the design of the rocket or missile.

Rockets are being increasingly employed to carry or transport a payload or cargo. Said payload or cargo can be a military missile such as a bomb or an explosive shell, a scientific instrument such as an earth satellite, and in the future commercial cargoes will probably be so transported. Thus, herein and in the claims, unless otherwise specified, the term "cargo" is employed generically and includes any burden or load which is carried or conveyed from one location to another.

Rockets require accurate control of heading or attitude and velocity. The heading or attitude in flight is largely controlled by what are known as guidance systems. The velocity is largely controlled by the design of the propulsion system. Generally, any rocket propulsion system must be slightly over-designed in order to insure that the desired terminal velocity will be attained. When the terminal velocity has been attained, accurate and rapid termination of the thrust must be accomplished to maintain the remainder, i.e., the non-sustained phase, of the trajectory. When the propulsion system, either one or more stages, is located behind or aft of the cargo (as determined by the flight heading) the problem of thrust termination becomes difficult. I have found that the problems associated with thrust termination can be mitigated to a large extent by locating or carrying the cargo behind the propulsion system. In such an arrangement, the cargo is "pulled" instead of being "pushed." Since the thrust of the propulsion system is still active at the time termination is desired, I have found that thrust termination, insofar as the cargo is concerned, can be accomplished accurately and quickly, simply by releasing the cargo from the rocket or propulsion system. The change in mass of the rocket which occurs upon release of the cargo therefrom results in a great increase in acceleration of the rocket and causes said rocket to accelerate away from said cargo.

Thus, broadly speaking, my invention comprises a method, and an apparatus for carrying out said method, for launching a cargo from the after end of a rocket motor while said rocket motor is developing thrust so as to cause acceleration of the rocket motor away from said cargo and thus launch said cargo into non-sustained flight.

An object of this invention is to provide a method of launching a cargo into non-sustained flight from the after end of a rocket motor. Another object of this invention is to provide an apparatus for launching a cargo from the after end of a rocket motor. Still another object of this invention is to provide an apparatus and a method for accurately and rapidly terminating thrust applied to a cargo carried by a rocket motor. Other aspects, objects, and advantages of the invention will be apparent to those skilled in the art in view of this disclosure.

Thus, according to the invention there is provided a cargo launcher comprising, in combination: a rocket motor; wall means defining a cargo-bay in the after end of said rocket motor; means for detachably securing a cargo in said cargo-bay; and means for detaching said cargo from said cargo-bay while said rocket motor is developing thrust so as to cause acceleration of said rocket motor away from said cargo and thus launch said cargo into non-sustained flight through space independent of said rocket motor.

Further according to the invention there is provided a method for launching into non-sustained flight a cargo detachably secured in a cargo-bay of a rocket motor, which method comprises: developing thrust in said rocket motor for a predetermined period of time; and terminating application of thrust to said cargo by detaching said cargo from said cargo-bay while said rocket motor is developing thrust so as to cause said rocket motor to accelerate away from said cargo.

FIGURE 1 is a view, partly in cross section and partly in elevation, of one embodiment of the invention illustrating a two-stage rocket adapted to launch a cargo from the after end of the second stage.

FIGURE 1–A is an enlarged view of the nose portion of the two-stage rocket illustrated in FIGURE 1.

FIGURE 2 is a cross section of the rocket of FIGURE 1 taken along the line 2—2.

FIGURE 3 is a cross section of the rocket of FIGURE 1 taken along the line 3—3.

FIGURE 4 is an enlarged cross section of the rocket of FIGURE 1 taken along the line 4—4.

FIGURE 5 is a diagrammatic illustration showing the relation between a rocket motor and a cargo launched therefrom, immediately after launching of said cargo.

FIGURE 6 is an enlarged view of the cargo-bay, and cargo therein, taken along the line 3—3 of FIGURE 1.

FIGURE 7 is a diagrammatic representation of the trajectories resulting from operation of the cargo launcher of FIGURE 1.

FIGURE 8 is an elevation of a cargo launcher employing a propulsion system having three rocket stages.

FIGURE 9 is a schematic representation of another application of the invention.

Referring now to the drawings, the invention will be more fully explained. In FIGURE 1 there is illustrated a cargo launcher designated generally as 10 and having a propulsion system comprised of a first stage rocket motor 11 and a second stage rocket motor 12. Said second stage rocket motor is releasably connected in axial alignment with the forward end of said first rocket motor. Any suitable means for connecting said first and second stage rocket motors can be employed. As here illustrated, the forward end of the first stage rocket motor overlaps the after end of the second stage rocket motor. A recess is provided in the overlapping portion of each of said rocket motors. A "key" 13 of Primacord is inserted in said recess and serves to hold said rocket motors together. Primacord is a waterproof flexible cord having a core of pentaerythritol tetranitrate (PETN). As here employed the Primacord is preferably encased in a thin sheath of soft metal such as lead. It will be understood, of course, that the thrust applied in flight by the first rocket motor also serves to hold said rocket motors together, and therefore the holding action required of the Primacord is relatively small and serves primarily to insure that the rocket motors are kept in alignment prior to actual launching. An ogival nose cap 14 is attached to the forward end of the second stage rocket motor by means of metal key 16. O-ring 17 provides a seal between the case 18 of said second stage rocket motor and said nose piece. Guidance means 19 is disposed at the forward end of second stage rocket motor 12 and is connected thereto by means of suitable supports 21. Said nose piece 14 covers said guidance means. Said guidance means can be any suitable type of a conventional guidance system. The type of guidance means employed will depend upon the design and requirements of the cargo launcher and the propulsion systems employed therein as will be understood by those skilled in the art. There are three general types of guidance systems. One is a passive system, often called the Command System, in which the rocket or missile carries very little guidance equipment. The radars and computers, i.e., the nervous system, are all on the ground or in a control airplane. They identify and track both the target and missile or rocket by means of radars and other tracking devices, log the courses of each, and issue instructions to the missile or rocket itself. In a second type, often called the Active Guidance System, almost all the equipment for locating the position of the missile or rocket, and for terminal guidance, are located within the frame of the missile or rocket. A third type, the Semi-Active Guidance System, falls in between the other two.

Said first stage rocket motor 11 comprises a shell or case 22 which defines a combustion chamber. An axially disposed nozzle 23 is attached to the after end of said case 22. A propellant charge (see FIGURE 4) comprising a plurality of cog grains 24 longitudinally and circumferentially contiguously aligned to form a cylindrical liner around the inner wall of said case 22. The bottom portion and end portions of said cog grains are covered with a suitable restrictor material 26, thus each joint between each of the grains is restricted. The base portions of said grains are adhesively bonded to the wall of said case 22. The projecting portions of said grains, which extend radially inwardly, preferably all have the same length although projecting portions of different lengths can be employed. Suitable rails 27 made of wood or other slowly-combustible material are bolted or otherwise secured to the wall of case 22 and extend longitudinally of combustion chamber 28 between sections, such as quadrants, of the propellant liner 24.

The combustion chamber 28 is loaded with a plurality of tandem propellant charge units or grains comprising a plurality of longitudinally and spacially aligned triformed propellant grains 29. Said grains 29 are each supported by means of a rod 31 which extends longitudinally therethrough. Said rod 31 is supported at each end by means of suitable plates (not shown). Further details of the specific alignment of the propellant charge can be found in copending application, Serial No. 717,259, filed February 24, 1958, by W. G. Haynes and A. C. Keithly. Any suitable arrangement of propellant charge can be employed in place of that described. Another suitable arrangement of propellant charge is that described and claimed in copending application, Serial No. 592,989, filed June 21, 1956, by Elton E. Rush. A suitable igniter 25 is provided for igniting said propellant charge. Said igniter can be of any suitable type and is ignited by means of the wires shown which are connected into a firing circuit (not shown) at the firing platform (not shown).

Said second stage rocket motor comprises a case 18 defining a combustion chamber 31. Disposed within said case 18 and circumferentially aligned around the inner circumference thereof are four venturi-like nozzles 32. Said nozzles communicate with combustion chamber 31 and provide means for the escape of combustion gases from said combustion chamber. As shown in FIGURE 1 said nozzles are formed from a castable refractory insulating material 33 and lined with a heat resistant Formica. Any suitable castable refractory material such as Adachrome Cast, sold by the Botfield Refractories Company, can be employed. Said Formica is sold by the Formica Company. Said Formica is a laminated material comprising a topsheet of melamine resin, a porous sheet of paper, etc., saturated with melamine resin filled with a suitable filler, a layer of sheet metal foil, and a multilayer core of strong kraft paper impregnated with phenol-formaldehyde resin. Said resins are thermosetting and the liner for said nozzles is molded to the desired shape by application of heat and pressure. Any other suitable thermosetting material can be employed instead of said Formica.

Disposed within the throat of each of said nozzles is a two-stage starter disc 34. The use of starter discs in the nozzle in rocket motors is conventional and serves to aid in establishing equilibrium combustion conditions in the combustion chamber of said motor. While any suitable starter disc can be employed in the rocket motor of our invention, it is preferred to employ a two-stage starter disc comprising a primary starter disc 36 and a secondary starter disc 37. In operation, when sufficient pressure has developed in combustion chamber 31 to rupture primary starter disc 36, the combustion gases flow through the axial perforation of secondary starter disc 37 and progressively enlarge same by an eroding and melting action until finally the gas flow through the nozzle passage is controlled solely by the actual throat area defined by the restricted portion of the nozzle.

The secondary starter disc 37 can be made of many different rigid materials, preferably having a heat distortion temperature greater than about 180° F. (ASTM Spec. D648) and can be reinforced with any type of reinforcement material. Secondary starter disc 37 is preferably made of rigid plastic materials such as acrylics, melamines, phenolics, furanes, polyamids, cellulose acetate butyrate, polyesters, epoxies, silicones, and the like; specifically, materials having the following registered trademarks are especially useful: Nylon, Lucite, Plexiglas and Marlex. We have found in actual practice that Plexiglas is a very desirable material. The primary starter disc 36 can also be made from the above materials. In addition, the primary starter disc can also be made from aluminum or aluminum alloys, steel, copper or copper alloys, glass, rubber, and any other rigid or semi-rigid material.

Combustion chamber 31 is filled with a propellant charge as illustrated in FIGURE 2. Said propellant charge comprises a plurality of wedge shaped grains 38 having a restrictor material 39 adhesively applied to their base portions which in turn is adhesively bonded to the inner wall of case 18. Said grains 38 are aligned so as to form with their exposed surfaces 41 a star-shaped perforation which extends coaxially through combustion chamber 31. Said exposed surfaces 41 serve as the burning surfaces of the propellant material as will be understood by those skilled in the art. An igniter 30 which comprises a perforated tube filled with igniter material is disposed in said star-shaped perforation for igniting said propellant. Said igniter material is ignited by a signal or electric current delivered from guidance system 19 via wires 35 which extend through an resulting refractory plug 40 as shown. Any suitable type of igniter means can be employed in place of that shown. It will be noted that the points of the star-shaped perforation are filled with restrictor material. Grains 38 will have a triangular shaped burning surface, which corresponds roughly with the shape of the grain until it is burned out, and there would normally exist a triagular or wedge-shaped sliver of propellant which is normally wasted. In order to avoid this, a triangular shaped wedge 42 of restrictor materials, has been formed in the base portion of each propellant grain.

Conduit 43 extends through one of said wedge-shaped portions and serves as a conduit for lead wires 56 as described further hereinafter. Conduit 44 extends through another of said wedges 42 of restrictor material and carries lead wires 57 for a purpose described further hereinafter.

A cylindrical wall 46 is disposed coaxially of the rocket motor and between said nozzles 32. One end of said cylindrical wall 46 is closed with an ogival shaped wall 47. Said ogival shaped wall 47 is also protected with a Formica covering as are the interiors of nozzles 42. Said cylindrical wall 46 and said ogival shaped wall 47 together comprise wall means defining a cargo-bay 48 which is thus disposed in the after end of rocket motor 12. A cargo 49 is supported within said cargo-bay 48 by any suitable antifriction means such as ball bearings 51 maintained in suitable races. Said cargo 49 is detachably secured in said cargo-bay by means of expandable clamps 52 which surround said cargo. An explosive bolt 53 (see FIGURE 3) is provided for holding each of said clamps 52 in clamping position in contact with said cargo 49. Said clamps normally would be in an expanded condition and can be fabricated from any suitable spring steel to accomplish this purpose. However, it is preferred to provide a plurality of tension springs 54 connected to cylindrical wall 46 and said clamps 52 so as to more positively bias said clamps to said normally expanded condition when not held in clamping position by bolt 53. Lead wires 56 are connected to explosive bolt 53 and extend through conduit 43 to guidance means 19.

In operation, the assembly of rocket motors shown in FIGURE 1 is placed on a suitable firing platform and the propellant charge in first stage rocket motor 11 is ignited by means of igniter 25 whereupon said assembly is launched. After a predetermined time, and when the propellant charge in rocket motor 11 is substantially spent, but before it is completely spent, Primacord 13 is ignited by an electric current from a source of power (such as a battery, not shown) in guidance system 19 and transmitted to said Primacord via wires 57 in conduit 44. As explained previously said guidance system 19 can be of a type to determine this ignition of Primacord 13 within itself, or guidance system 19 can, upon signal from the launching base, furnish the power for igniting said Primacord. The Primacord burns and leaves said rocket motors free to separate upon development of thrust by the second stage rocket motor 12. At a predetermined interval after Primacord 13 has been ignited or electric current from guidance system 19 transmitted via wires 35 causes igniter 30 to ignite and ignite the propellant charge in second stage rocket motor 12. Upon development of sufficient pressure in combination chamber 31 primary starter disc 36 is ruptured and said pressure is supplied against the forward end of first stage rocket motor 11 and serves to disengage said rocket motors.

Second stage rocket motor 12 is now in the sustained phase of its trajectory. When the desired velocity has been attained, guidance system 19 transmits a signal or electric current via lead wires 56 to explosive bolt 53 which explodes and releases clamps 52 and cargo 49 is detached from cargo-bay 48. Upon the release of clamps 52, application of thrust to cargo 49 is terminated and the rocket motor 12 accelerates away from cargo 49 at a rapid rate due to the decrease in mass effected by the release of cargo 49. Rocket motor 12 then continues at an accelerating velocity until the propellant charge therein is consumed.

Referring to FIGURE 7, the operation just described is illustrated diagrammatically. Upon launching of the assembled rocket motors first stage rocket motor 11 carries the assembled apparatus through the booster phase and upon separation from second stage rocket motor 12 said first stage returns to the earth as indicated. After the first stage rocket motor has been separated and after the second stage rocket motor has attained the desired velocity, the cargo is released under predetermined conditions and continues in non-sustained flight to its target as shown. While not shown in the drawings, it is within the scope of the invention for cargo 49 to carry guidance means within itself which will guide it to its target. After the cargo 49 has been launched the second stage rocket continues and returns to the earth at some farther point as shown.

Referring again to FIGURE 7, one of the primary advantages of the invention can be better understood when the cargo launcher of the invention is being employed to launch a bomb or other explosive missile. In such instances it is desirable, if at all possible, that the cargo avoid detection and interception by the enemy. As is well known to those skilled in the art, radar and other detection devices can be used to detect and track relatively large objects such as second stage rocket motor 12 but it is difficult to detect and track relatively small objects travelling at extremely high velocities. Thus here, when the enemy has picked up second stage rocket motor 12 and is tracking same, due to the comparatively small size of cargo 49 relative to rocket motor 12, said cargo 49 will frequently escape detection when it is launched from rocket motor 12 because the tracking apparatus will continue to track rocket motor 12 and will not pick up cargo 49 when it is launched from the after end of said rocket motor 12.

It is believed that in view of the above detailed description of the invention that the increased accuracy in launching cargoes which can be attained by the invention will be readily apparent to those skilled in the art. The invention provides means for launching a cargo after the rocket motor is steadily on course and has attained its correct velocity and heading. No explosive forces which would tend to throw the cargo off course are employed in launching the cargo. Thus, when launched, the cargo will continue upon the exact heading which the rocket motor had at the time the cargo was launched.

In FIGURE 9 another operation in which the invention is applicable is illustrated diagrammatically. A 3-stage rocket such as illustrated in FIGURE 8, and having cargo 49 releasably secured in a cargo-bay in third stage rocket motor 61, is launched similarly as described above in connection with 2-stage rocket 10. First stage rocket motor 11 is separated as described and returns to the earth E at point 62. Second stage rocket motor 12 is separated from third stage rocket motor 61 in similar manner and returns to the earth E at point 63. Cargo 49 is launched from the after end of rocket motor 61 at about the point shown and continues to orbit in orbit 64. Third stage rocket motor 61 is accelerated by the release of cargo 49 and orbits about the earth E in orbit 66. Thus the invention provides a method and apparatus for the launching of two earth satellites, each of which can carry scientific instruments and which, due to the different positions thereof can be employed to gather related but different data for correlation.

The propellant material utilized in fabricating the propellant charges used in the rocket motors of this invention can be prepared from a variety of known compounding materials. Particularly useful propellant compositions which may be utilized in the practice of this invention are of the rubbery copolymer-oxidizer composite type which are plasticized and worked to prepare an extrudable mass at 130° to 175° F. The copolymer can be reinforced with suitable reinforcing agents such as carbon black, silica, and the like. Suitable oxidizers include the alkali metal, alkaline earth metal, and ammonium salts of nitric, and perchloric acids, such as ammonium nitrate and ammonium perchlorate. Suitable oxidation inhibitors, wetting agents, modifiers, vulcanizing agents, and accelerators can be added to aid processing and to provide for the curing of the extruded propellant grains at temperatures preferably in the range of 170°–185° F. In addition to the copolymer binder and other ingredients, the propellant composition comprises an oxidizer and a burning rate catalyst. The resulting mixture is heated to effect curing of the same.

Solid propellant compositions particularly useful in the preparation of the propellants used in this invention are prepared by mixing the copolymer with a solid oxidizer, a burning rate catalyst, and various other compounding ingredients so that the reinforced binder forms a continuous phase and the oxidizer a discontinuous phase. The resulting mixture is heated to effect curing of the same.

Composite solid propellant compositions of the types preferred in this invention and found to be of particular value in actual practice are those disclosed and claimed in copending applications Serial No. 284,447, filed April 25, 1952, by W. B. Reynolds et al., and Serial No. 561,-943, filed January 27, 1956, by W. B. Reynolds et al. The propellant compositions of these copending applications comprises a rubbery copolymer of a heterocyclic nitrogen base compound with a conjugated diene, mixed with a solid oxidizer.

The copolymers utilized as binders in the propellant compositions of said copending applications are preferably formed by copolymerization of a vinyl heterocyclic nitrogen compound with an open chain conjugated diene. The conjugated dienes employed are those containing 4 to 6 carbon atoms per molecule and representatively include 1,3-butadiene, isoprene, 2,3-dimethyl-1,3-butadiene, and the like. The vinyl heterocyclic nitrogen base compound generally preferred is a monovinylpyridine or alkyl-substituted monovinylpyridine such as 2-vinylpyridine, 3-vinylpyridine, 4-vinylpyridine, 2-methyl-5-vinylpyridine, 5 - ethyl-2-vinylpyridine, 2,4 - dimethyl-6-vinylpyridine, and the like. The corresponding compounds in which an alpha-methylvinyl (isopropenyl) group replaces the vinyl groups are also applicable.

In the preparation of the copolymers, the amount of conjugated diene employed is in the range between 75 and 95 parts by weight per 100 parts of copolymer and the vinyl heterocyclic nitrogen is in the range between 25 and 5 parts. Terpolymers are applicable as well as copolymers and in the preparation of the former up to 50 weight percent of the conjugated diene can be replaced with another polymerizable compound such as styrene, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML-4) plasticity value in the range of 10–40, preferably in the range of 15 to 25, and may be masterbatched with 5–20 parts of Philblack A, a furnace black, per 100 parts of copolymer. Masterbatching refers to the method of adding carbon black to the latex before coagulation and coagulating to form a high degree of dispersion of the carbon black in the copolymer. In order to facilitate dispersion of the carbon black in the latex, Marasperse–CB, or similar surface active agent, is added to the carbon black slurry or to the water used to prepare the slurry.

The following empirical formulation or recipe generally represents the class of propellant compositions disclosed in said copending applicaitons which are preferred for the preparation of the propellant grains of this invention.

Table I

| Ingredient | Parts Per 100 Parts of Rubber | Parts By Weight |
|---|---|---|
| Binder | | 10–25 |
| Copolymer (Bd/MVP) | 100 | |
| Philblack A (a furnace black) | 10–30 | |
| Plasticizer | 10–30 | |
| Silica | 0–20 | |
| Metal Oxide | 0–5 | |
| Antioxidant | 0–5 | |
| Wetting Agent | 0–2 | |
| Accelerator | 0–2 | |
| Sulfur | 0–2 | |
| Oxidizer (Ammonium Nitrate or Perchlorate) | | 75–90 |
| Burning Rate Catalyst | | 0–30 |

Suitable plasticizers useful in preparing these propellant grains include TP–90–B [Di-(butoxy ethoxy)methane] supplied by Thiokol Corporation; benzophenone; Butarez (liquid polybutadiene); Philrich 5 (a highly aromatic oil); TP–90B (Dibutoxyethoxy formal); ZP–211 (same as TP–90B with low boiling materials removed); and Pentaryl A (monoamylbiphenyl). Suitable silica preparations include a 10–20 micron size range supplied by Davison Chemical Company; and Hi-Sil 202, a rubber grade material supplied by Columbia-Southern Chemical Corporation. A suitable anti-oxidant is Flexamine, a physical mixture containing 65 percent of a complex diarylamine-ketone reaction product and 35 percent of N,N'-diphenyl-p-phenylenediamine, supplied by Naugatuck Chemical Corporation. A suitable wetting agent is Aerosol–OT (dioctyl sodium sulfosuccinate), supplied by American Cyanamid Company. Satisfactory rubber cure accelerators include Philcure 113 (SA–113, N,N-dimethyl-S-tertiary butylsulfenyl dithiocarbamate); Butyl-8 (a dithiocarbamate-type rubber accelerator), supplied by R. T. Vanderbilt Company; and GMF (quinone dioxine), supplied by Naugatuck Chemical Company. Suitable metal oxides include zinc oxide, magnesium oxide, iron oxide, chromium oxide, or combination of these metal oxides. Suitable burning rate calalysts include ferrocyanides sold under various trade names such as Prussian blue, steel blue, bronze blue, Milori blue, Turnbul's blue, Chinese blue, new blue, Antwerp blue, mineral blue, Paris blue, Berlin blue, Erlanger blue, foxglove blue, Hamberg blue, laundry blue, washing blue, Williamson blue, and the like. Other burning rate catalysts such as ammonium dichromate, potassium dichromate, sodium dichromate, ammonium molybdate, copper chromite and the like, can also be used.

Propellant compositions found of particular value in the practice of this invention are set forth in Table II.

Table II

| Ingredients | Formulations, Total Parts By Weight | | | | |
|---|---|---|---|---|---|
| | A | B | C | D | E |
| Bd/MVP Copolymer, 90/10 | 10.31 | 9.68 | | | |
| Bd/MVP Copolymer, 85/15 | | | 4.83 | 4.22 | 4.22 |
| Butarez | | | 4.83 | 4.22 | 4.22 |
| Philblack A | 2.32 | 2.18 | 1.93 | | |
| Philblack E | | | | 2.11 | 2.11 |
| Philrick 5 | | | 1.16 | 2.11 | 2.11 |
| Flexamine | 0.31 | 0.29 | 0.29 | 0.25 | 0.25 |
| Zinc Oxide | 0.50 | | 0.48 | | |
| Magnesium Oxide | 2.06 | 0.47 | 0.48 | 0.42 | 0.42 |
| ZP–211 | 2.06 | 1.93 | | | |
| Ammonium Nitrate | 85.00 | 79.81 | 86.00 | 81.91 | 81.91 |
| Ammonium Dichromate | 4.00 | 3.76 | 5.00 | 0.95 | |
| Milori Blue | 2.00 | 1.88 | | 3.81 | 4.76 |

The slow burning restrictor material applied to the propellant grains can be made from any of the slow burning materials used for this purpose in rocket art, such as cellulose acetate, ethyl cellulose, butadiene-methylvinylpyridine copolymer, GR–S, and the like. The cylindrical liner to which the cog grains are bonded can also be fabricated from similar material. The slow burning restrictor material and this liner can be adhesively bonded to the propellant by any suitable adhesive.

The igniter material employed can be any suitable pyrotechnic material, such as black powder or the like, and preferably is a pelleted or granular pyrotechnic material disclosed and claimed in copending application, Serial No. 592,995, filed June 21, 1956 by L. G. Herring, now Patent 3,017,300, issued January 16, 1962. The pyrotechnic material disclosed in the latter mentioned copending application comprises a rubbery binder, a solid oxidizer, and powdered metal. Ignition pyrotechnic material of this type found to be of particular value in actual practice is set forth in Table III.

Table III

| Ingredients | Formulation, Parts By Weight | |
|---|---|---|
| | A | B |
| Potassium Perchlorate | 62.50 | 56.94 |
| Aluminum | 12.50 | 24.26 |
| Boron | 8.65 | |
| Zirconium/Nickel Alloy (50:50) | 12.50 | 15.04 |
| Ethylcellulose | 3.85 | 3.01 |
| Calcium Stearate | | 0.75 |

Variations and modifications of the invention can be made by those skilled in the art without departing from the scope or spirit thereof, and it is to be understood that all matter herein set forth in the discussion and drawings is merely illustrative and does not unduly limit the invention.

I claim:

1. A cargo launcher assembly comprising, in combination: a rocket motor housing; a propellant charge mounted in a combustion chamber disposed in the intermediate portion of said housing; wall means defining a cargo-bay axially disposed in the after end portion of said housing; a plurality of propelling exhaust nozzles in communication with said combustion chamber and spaced circumferentially around said cargo-bay; a starter disc in each of said nozzles; a cargo disposed in said cargo-bay; anti-friction means supporting said cargo in said cargo-bay; an explosive bolt in each of said clamps for holding each of said clamps in clamping position in contact with said cargo; means for igniting said propellant; a plurality of tension springs attaching said clamps to the wall of said cargo bay and adapted to bias said clamps to a normally expanded condition when said bolts are exploded and thus release said cargo; and means for exploding said explosive bolts while said propellant is burning and developing thrust so as to cause acceleration of the remainder of said assembly away from said cargo and thus launch said cargo into non-sustained flight.

2. A cargo launcher assembly comprising, in combination: a first rocket motor having a propellant charge therein; a second rocket motor having a propellant charge therein and releasably connected in axial alignment to the forward end of said first rocket motor, said rocket motors being separable in flight responsive to thrust developed after said propellant in said second rocket motor is ignited; wall means defining a cargo bay in the after end of said second rocket motor; a plurality of propellant exhaust nozzles in communication with the combustion chamber of said second rocket motor and spaced circumferentially around said cargo bay; a cargo disposed in said cargo bay; anti-friction means supporting said cargo in said cargo bay; a plurality of expandable clamps surrounding said cargo; an explosive bolt in each of said clamps for holding each of said clamps in clamping position in contact with said cargo to secure same in said cargo bay; a plurality of tension springs attached to said clamps and to the wall of said cargo bay and adapted to bias said clamps to a normlly expanded condition when said bolts are exploded and thus release said cargo; means for igniting said propellant in said first rocket motor so as to launch said assembly; means for igniting said propellant in said second rocket motor when the propellant in said first rocket motor is substantially consumed; and means for exploding said explosive bolts while said propellant in said second rocket motor is burning and developing thrust so as to cause acceleration of said second rocket motor away from said cargo and thus launch said cargo into non-sustained flight.

3. A cargo launcher assembly comprising, in combination: a plurality of separable rocket motors comprising a leading rocket motor, a following rocket motor, and at least one intermediate rocket motor disposed between said leading rocket motor and said following rocket motor; each of said rocket motors carrying propellant for propelling same; said rocket motors being releasably connected in series in axial alignment and successively separable in flight responsive to thrust developed after the propellant in a succeeding rocket motor of said series is ignited; wall means defining a cargo bay in the after end of said leading rocket motor; a cargo disposed in said cargo bay; anti-friction means supporting said cargo in said cargo bay; a plurality of expandable clamps surrounding said cargo; an explosive bolt in each of said clamps for holding each of said clamps in clamping position in contact with said cargo to secure same in said cargo bay; a plurality of tension springs attached to said clamps and to the wall of said cargo bay and adapted to bias said clamps to a normally expanded condition when said bolts are exploded and thus release said cargo; means for igniting said propellant in said following rocket motor so as to launch said assembly; means for igniting said propellant in said intermediate rocket motor when the propellant in said following rocket motor is substantially consumed; means for igniting the propellent in said leading rocket motor when the propellant in said intermediate rocket motor is substantially consumed; and means for exploding said explosive bolt while said propellant in said leading rocket motor is burning and developing thrust so as to cause acceleration of said leading rocket rotor away from said cargo and thus launch said cargo into non-sustained flight.

4. A cargo launcher assembly comprising, in combination: a rocket motor for developing and applying thrust to said assembly; wall means defining a coaxially disposed cargo-bay in the after end of said rocket motor; a plurality of anti-friction means supporting a cargo in said cargo-bay; a plurality of expandable clamps surrounding said cargo; an explosive bolt in each of said clamps for holding each of said clamps in a clamped condition on said cargo to secure same in said cargo bay; and a plurality of tension springs attaching said clamps to the wall of said cargo-bay and adapted to bias said clamps to a normally expanded condition when said bolt is exploded so as to release said cargo and launch same by terminating application of thrust thereto.

5. A cargo launcher assembly comprising, in combination: a rocket motor for developing and applying thrust to said assembly; wall means defining a cargo-bay axially disposed in the after end portion of said rocket motor; a cargo disposed in said cargo-bay; a plurality of expandable clamps surrounding said cargo; an explosive bolt in each of said clamps for holding each of said clamps in clamping position in contact with said cargo; a plurality of tension springs attaching said clamps to the wall of said cargo-bay and adapted to bias said clamps to a normally expanded condition when said bolts are exploded and thus release said cargo; and means for exploding said explosive bolts while thrust is being developed by said motor so as to cause acceleration of the remainder of said assembly away from said cargo and thus launch said cargo into non-sustained flight.

References Cited in the file of this patent

UNITED STATES PATENTS

| | | |
|---|---|---|
| 1,102,653 | Goddard | July 7, 1914 |
| 1,365,865 | Svejda | Jan. 18, 1921 |
| 2,596,209 | Hausson | May 13, 1952 |
| 2,686,473 | Vogel | Aug. 17, 1954 |
| 2,714,999 | Thiebolt | Aug. 9, 1955 |
| 2,804,823 | Jablansky | Sept. 3, 1957 |
| 2,809,583 | Ortynsky | Oct. 15, 1957 |
| 2,809,584 | Smith | Oct. 15, 1957 |

FOREIGN PATENTS

| | | |
|---|---|---|
| 1,005,077 | France | Dec. 12, 1951 |

---

UNITED STATES PATENT OFFICE
CERTIFICATE OF CORRECTION

Patent No. 3,026,772                                             March 27, 1962

Carlton A. Moreland

It is hereby certified that error appears in the above numbered patent requiring correction and that the said Letters Patent should read as corrected below.

Column 9, line 49, after "cargo-bay;" insert -- a plurality of expandible clamps surrounding said cargo; --.

Signed and sealed this 30th day of October 1962.

(SEAL)
Attest:

ERNEST W. SWIDER
Attesting Officer

DAVID L. LADD
Commissioner of Patents

UNITED STATES PATENT OFFICE
CERTIFICATE OF CORRECTION

Patent No. 3,026,772            March 27, 1962

Carlton A. Moreland

It is hereby certified that error appears in the above numbered patent requiring correction and that the said Letters Patent should read as corrected below.

Column 9, line 49, after "cargo-bay;" insert -- a plurality of expandible clamps surrounding said cargo; --.

Signed and sealed this 30th day of October 1962.

(SEAL)
Attest:

ERNEST W. SWIDER
Attesting Officer

DAVID L. LADD
Commissioner of Patents